(12) United States Patent
Matsui et al.

(10) Patent No.: US 11,628,511 B2
(45) Date of Patent: Apr. 18, 2023

(54) METHOD OF MANUFACTURE OF SPOT WELDED JOINT, STEEL SHEET FOR SPOT WELDING USE, AND STEEL SHEET MEMBER FOR SPOT WELDING USE

(71) Applicant: NIPPON STEEL CORPORATION, Tokyo (JP)

(72) Inventors: Sho Matsui, Tokyo (JP); Masahiro Saito, Tokyo (JP); Seiji Furusako, Tokyo (JP); Yasunobu Miyazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 378 days.

(21) Appl. No.: 16/652,351

(22) PCT Filed: Oct. 5, 2018

(86) PCT No.: PCT/JP2018/037476
§ 371 (c)(1),
(2) Date: Mar. 30, 2020

(87) PCT Pub. No.: WO2019/070075
PCT Pub. Date: Apr. 11, 2019

(65) Prior Publication Data
US 2020/0269341 A1    Aug. 27, 2020

(30) Foreign Application Priority Data
Oct. 5, 2017  (JP) .............................. JP2017-195134

(51) Int. Cl.
*B23K 11/11* (2006.01)
*B23K 11/34* (2006.01)
(Continued)

(52) U.S. Cl.
CPC ............... *B23K 11/11* (2013.01); *B23K 11/34* (2013.01); *B23K 2101/18* (2018.08); *B23K 2103/04* (2018.08)

(58) Field of Classification Search
CPC ....... B23K 11/11; B23K 11/34; B23K 11/115; B23K 9/235; B23K 2101/18;
(Continued)

(56) References Cited

U.S. PATENT DOCUMENTS 4,633,054 A * 12/1986 Patrick .................. B23K 11/16
219/118
10,018,329 B1 * 7/2018 Belliveau .............. F21V 11/186
(Continued)

FOREIGN PATENT DOCUMENTS

JP       64-5832 A     1/1989
JP       6-304765 A    11/1994
(Continued)

OTHER PUBLICATIONS

Michigan Metrology, 3D S Parameters—Spatial Parameters, 2016 (Year: 2016) https://www.michmet.com/3d_s_spatial_parameters.htm.*

*Primary Examiner* — John J Norton
*Assistant Examiner* — Simpson A Chen
(74) *Attorney, Agent, or Firm* — Birch, Stewart, Kolasch & Birch, LLP

(57) ABSTRACT

Art for spot welding able to suppress penetration of hydrogen, one of the factors behind delayed fracture, at the time of spot welding, that is, a spot welding method in which at one or both of the surfaces of the steel sheets becoming the facing surfaces of the overlaid steel sheets, a location where the steel sheets contact each other to form a contact part at the time of initial squeezing of the spot welding is worked in advance to form a plurality of lines running through the (Continued)

contact part and connected to the outside of the contact part and the spot welding is performed at the location of the contact part and also a steel sheet in which the plurality of lines are formed in advance at the location becoming a contact part when steel sheets contact each other at the time of initial squeezing in the spot welding.

18 Claims, 8 Drawing Sheets

(51) Int. Cl.
    *B23K 101/18*    (2006.01)
    *B23K 103/04*    (2006.01)

(58) Field of Classification Search
    CPC ............ B23K 2101/34; B23K 2101/35; B23K 35/36; B23K 35/3612

USPC ...................................................... 219/91.2
See application file for complete search history.

(56) References Cited

U.S. PATENT DOCUMENTS

| 2005/0247678 A1* | 11/2005 | Wang | ................... B23K 11/166 |
| | | | 219/121.64 |
| 2017/0307111 A1 | 10/2017 | Matsuki | |

FOREIGN PATENT DOCUMENTS

| JP | 2014-185369 A | 10/2014 |
| JP | 2015-93282 A | 5/2015 |
| KR | 10-2016-0053316 A | 5/2016 |
| WO | WO 2016/047023 A1 | 3/2016 |

\* cited by examiner (a) SURFACE DRAWN BY PRESSING LOAD OF 4.8 MPa (b) ENLARGEMENT OF SURFACE OF (a)

0.40 mm (c) SURFACE DRAWN BY PRESSING LOAD OF 2.9 MPa (d) ENLARGEMENT OF SURFACE OF (c)

A. NO PROCESSING a1 — RANGE OF INITIAL CONTACT PART

B. FORMED BY DIE OR SCRIBER (NON-INTERSECTING GROOVES)

b1. SMALL NUMBER (LARGE AREA) — LINES b2. SUITABLE NUMBER AND AREA

C. FORMED BY DIE AND SCRIBER (INTERSECTING GROOVES)

c1. LARGE AREA c2. SUITABLE NUMBER AND AREA

D. FORMED BY ABRASIVE PAPER d1

E. LINES FORMED NOT EXTENDING BEYOND OUTER CIRCUMFERENCE OF INITIAL CONTACT PART e1

METHOD OF MANUFACTURE OF SPOT WELDED JOINT, STEEL SHEET FOR SPOT WELDING USE, AND STEEL SHEET MEMBER FOR SPOT WELDING USE

FIELD

The present invention relates to resistance spot welding of steel sheets.

BACKGROUND

In the automotive field, reduction of the weight of car bodies so as to improve the fuel economy for environmental protection and improvement of collision safety are being sought. For this reason, high strength steel sheets are being used to reduce thickness and car body structures are being optimized to lighten the weight of the car bodies and improve collision safety. Various attempts have been made toward this end up until now.

In the welding in manufacture and assembly of steel sheet members of automobiles etc., mainly spot welding by resistance welding has been used.

High strength steel sheets are large in amounts of carbon etc. of the base material so as to achieve strength. Further, in spot welding, the weld zone is heated, then immediately quenched, so the spot weld zone of high strength steel sheets becomes martensite structures and the hardness rises and toughness falls at the weld zone and heat affected zone. Further, at the weld zone, the welded joint becomes large in tensile residual stress due to the locally occurring expansion and contraction accompanying transformation.

In spot welding of high strength steel sheets, as a method for improving the toughness of the spot weld zone and securing the joint strength, there is the method of two-stage applying current comprising main current for forming a nugget then further post heat current for tempering the spot weld zone. With this method, post heat current can be used to anneal the spot weld zone (nugget part and heat affected zone) to lower the hardness of the weld zone.

On the other hand, when spot welding high strength steel sheets, delayed fracture (hydrogen embrittlement cracking) is also a concern. When delayed fracture is caused by hydrogen penetrating due to spot welding, it occurs in the short time of one to two days or so right after spot welding. It does not occur over a long period of time.

Delayed fracture is mainly governed by the three factors of the hardness of the steel sheets, the residual stress, and the amount of hydrogen in the steel sheets, but the spot weld zone is high in hardness and large in tensile residual stress, so if hydrogen penetration occurs, there is a possibility of delayed fracture being caused.

If delayed fracture occurs, in the quality indicators of welded joints of the tensile strength and fatigue strength, sufficient strength cannot be obtained. Further, if moisture penetrates those parts (fractures), corrosion will occur and the strength may further drop. These are concerns obstructing the reduction of weight (reduction of thickness) of car bodies by application of high strength steel sheets.

To deal with such a problem, PTL 1 discloses a spot welding technique raising the electrode force at the time of the post heat current after the time of the main current for forming the nugget compared with the electrode force P1 at the time of the main current and squeezing by the high electrode force P2 so as to introduce compressive residual stress to the surroundings of the weld zone and improve the hydrogen embrittlement resistance.

CITATIONS LIST

Patent Literature

[PTL 1] Japanese Unexamined Patent Publication No. 2015-93282

SUMMARY

Technical Problem

The art disclosed in PTL 1 can reduce the tensile residual stress of a weld zone, so is art effective for suppressing delayed fracture, but the effect of hydrogen penetrating the weld zone etc. at the time of welding is not particularly considered. It is desirable to suppress hydrogen embrittlement cracking due to penetration of hydrogen so as to further improve the hydrogen embrittlement resistance.

An object of the present invention, considering such a situation, is to provide spot welding art able to suppress penetration of hydrogen, one of the factors behind delayed fracture, at the time of spot welding.

Solution to Problem

In general, steel sheets before spot welding are stored in a state coated with oil (rust-preventing oil, cleaning oil, working oil, etc.). The oil is removed by volatization by the heat of the spot welding, so usually spot welding is performed without removing the oil deposited on the steel sheets.

Oil contains moisture or hydrogen, so the inventors thought that possibly the oil was a factor behind penetration of hydrogen at the steel sheets and therefore investigated the effects of hydrogen in the case of spot welding steel sheets with oil as deposited.

As a result, they discovered that if spot welding steel sheets with oil as deposited between the facing surfaces of the steel sheets, hydrogen penetrates the weld zone.

Further, in the process of studying means for decreasing the amount of hydrogen penetrating the steel at the time of welding, they discovered that at the time of the initial squeezing at the spot welding, oil is trapped between the contacting steel sheets and causes hydrogen to penetrate the steel sheets and that if forming in advance a plurality of lines (line-shaped grooves) at such a part where the steel sheets contact, the oil is discharged from the contact part through the lines and as a result penetration of hydrogen to inside the steel sheets can be suppressed.

The present invention was made based on such findings and has as its gist the following:

(1) A method of producing a spot welded joint of overlaid steel sheets characterized in that at one or both of the surfaces of the steel sheets becoming the facing surfaces of the steel sheets, a location where the steel sheets contact each other to form a contact part at the time of initial squeezing of the spot welding is worked in advance to form lines of a plurality of line-shaped grooves running through the contact part and connected to the outside of the contact part; and the spot welding is performed at the location of the contact part.

(2) The method of producing a spot welded joint according to the above (1), wherein the number of the lines is respectively four or more at both of the surfaces of the steel sheets becoming the facing surfaces of the steel sheets and, regarding the widths of the lines and the surface roughness Sa of the steel sheet surfaces of the contact part, the surfaces of the steel sheets becoming the facing surfaces are worked to form pluralities of lines so that, when the number of lines N is 4≤N<20, the width of the lines is 0.2/N (mm) or more and the surface roughness Sa is −0.09×N+2 (μm) or more and when the number of lines N is 20≤N, the surface roughness Sa is 0.2 μm or more.

(3) The method of producing a spot welded joint according to the above (2), wherein an area of the biggest range among the ranges divided by the lines or the outer circumference of the contact part is 30% or less of the area of the contact part.

(4) The method of producing a spot welded joint according to the above (1), wherein the number of the lines is respectively four or more at least at one of the surfaces of the steel sheets becoming the facing surfaces of the steel sheets and, regarding the widths of the lines and the surface roughness Sa of the steel sheet surfaces of the contact part, the surface of the at least one steel sheet becoming the facing surface is worked to form a plurality of lines so that, when the number of lines N is 4≤N<20, the width of the lines is 0.4/N (mm) or more and the surface roughness Sa is −0.07×N+1.9 (μm) or more and when the number of lines N is 20≤N, the surface roughness Sa is 0.5 μm or more.

(5) The method of producing a spot welded joint according to the above (4), wherein an area of the biggest range among the ranges divided by the lines or the outer circumference of the contact part is 30% or less of the area of the contact part.

(6) A steel sheet for spot welding use used in the method of producing a spot welded joint according to the above (1), in which steel sheet for spot welding use, a location of the steel sheet becoming a contact part contacting another steel sheet at the time of initial squeezing of the spot welding is formed in advance with a plurality of lines running through the contact part and connected to the outside of the contact part.

(7) The steel sheet for spot welding use according to the above (6), wherein the number of the lines is four or more and, regarding the widths of the lines and the surface roughness Sa of the steel sheet surface of the contact part, when the number of lines N is 4≤N<20, the width of the lines is 0.2/N (mm) or more and the surface roughness Sa is −0.09×N+2 (μm) or more and when the number of lines N is 20≤N, the surface roughness Sa is 0.2 μm or more.

(8) The steel sheet for spot welding use according to the above (7), wherein an area of the biggest range among the ranges divided by the lines or the outer circumference of the contact part is 30% or less of the area of the contact part.

(9) The steel sheet for spot welding use according to the above (6), wherein the number of the lines is four or more and, regarding the widths of the lines and the surface roughness Sa of the steel sheet surface of the contact part, when the number of lines N is 4≤N<20, the width of the lines is 0.4/N (mm) or more and the surface roughness Sa is −0.07×N+1.9 (μm) or more and when the number of lines N is 20≤N, the surface roughness Sa is 0.5 μm or more.

(10) The steel sheet for spot welding use according to the above (9), wherein an area of the biggest range among the ranges divided by the lines or the outer circumference of the contact part is 30% or less of the area of the contact part.

(11) The method of producing a spot welded joint according to the above (1), wherein an Str of the contact part formed with lines of a plurality of line-shaped grooves is 0.3 or less.

(12) A steel sheet used for the method of producing a spot welded joint according to the above (1), in which steel sheet for spot welding use, an Str of the contact part formed with lines of a plurality of line-shaped grooves is 0.3 or less.

(13) The method of producing a spot welded joint according to the above (1), wherein the lines of a plurality of line-shaped grooves are formed by using a die having projecting parts at least at part of the surface contacting the steel sheet and making steel sheet slide with respect to the die to thereby form in advance an unevenness of stripe pattern running through the contact part and connected to the outside of the contact part.

(14) The method of producing a spot welded joint according to the above (13), wherein an Str of the contact part formed with the unevenness of stripe pattern is 0.3 or less.

(15) A steel sheet member used in the method of manufacture of a spot welded joint of the above (13) or (14), in which steel sheet member for spot welding use, at the time of initial squeezing of spot welding with a steel sheet or a second steel sheet member into which a steel sheet is worked, a scheduled location becoming a contact part by contact with the steel sheet or second steel sheet member is formed with an unevenness of stripe pattern.

(16) The steel sheet member for spot welding use according to the above (15), wherein an Str of the contact part formed with the unevenness of stripe pattern is 0.3 or less.

Advantageous Effects of Invention

According to the present invention, even if spot welding steel sheets with oil as deposited between the facing surfaces of the steel sheets, the plurality of lines formed in advance form channels for discharging the oil and the oil is discharged to outside of the weld zone without being held between the steel sheets, so it becomes difficult for hydrogen to penetrate the weld zone. As a result, it is possible to keep hydrogen from penetrating the weld zone, one of the factors behind delayed fracture, so by jointly using this with the means such as described in PTL 1, it is possible to obtain a spot welded joint further improved in hydrogen embrittlement resistance.

DESCRIPTION OF EMBODIMENTS

In the present invention, at the time of spot welding steel sheets, at one or both of the surfaces of the steel sheets becoming the facing surfaces, a location where the steel sheets contact each other to form a contact part at the time of initial squeezing of the spot welding is worked in advance to form a plurality of lines (line-shaped grooves) running through the contact part and connected to the outside of the contact part. After that, spot welding is performed whereby even if the facing surfaces of steel sheets are coated with oil, the oil which had been coated there at the time of initial squeezing can be discharged from the contact part to the outside and oil can be kept from being trapped in the contact part and hydrogen kept from penetrating into the weld zone. The lines may be straight or curved.

In the present invention, the "steel sheet" used in manufacture of the welded joint includes cut sheets cut into sizes suitable for press-forming and tailored blanks comprised of a plurality of different types of steel sheets butt welded together. Further, blanks shaped for press-forming the steel sheets and press-formed members are also included.

Tests conducted leading up to the present invention will be explained next.

In assembly of members for automobile use by spot welding, the steel sheet members are supplied to the spot welding processing with oil as coated. Therefore, first, the inventors investigated if the oil became a source of penetration of hydrogen.

In conducting the test, as the test pieces, three types of test pieces of sizes of 30 mm×30 mm such as shown next were prepared. For the oil, rust-preventing oil (manufactured by Nihon Parkerizing Co., Ltd. NOX-RUST530F(60)) was used:

Test pieces A1 comprised of two thickness 1 mm steel sheets coated with oil at the two surfaces of the steel sheets and overlaid Test pieces A2 comprised of two thickness 1 mm steel sheets overlaid (both surfaces of the steel sheets not coated with oil)

Test pieces B comprised of two thickness 2 mm steel sheets (both surfaces of the steel sheets coated with oil)

Figure 1:
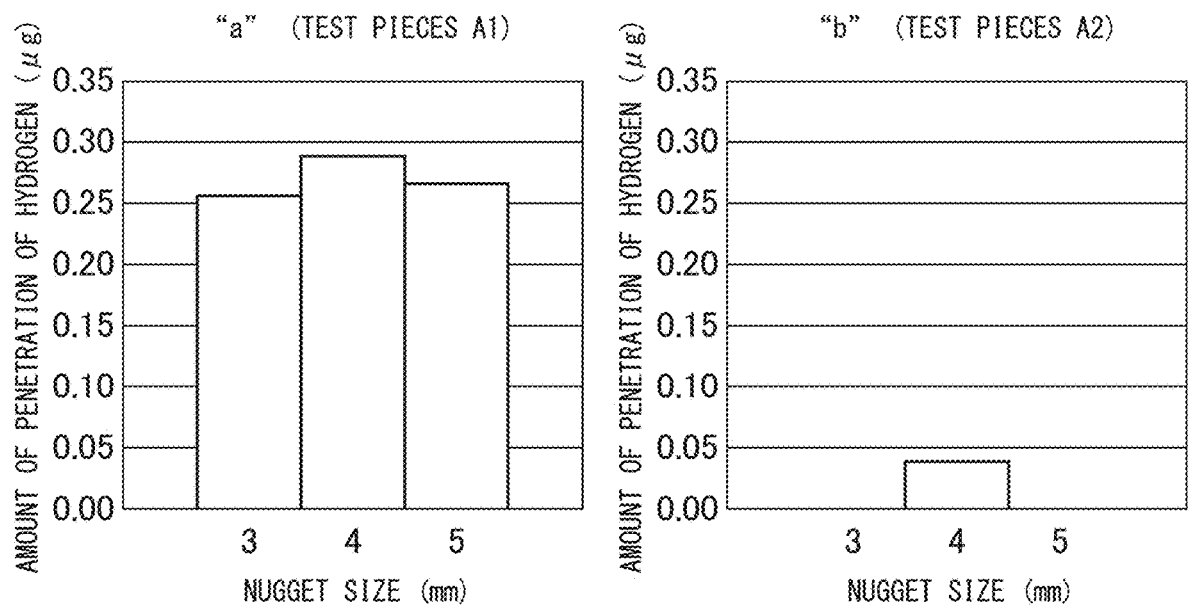
FIG. 1 is a view showing examples of amounts of hydrogen entering the spot weld zone after spot welding in the case where there is oil present between the facing surfaces of the steel sheets and the case where there isn't.

The test pieces A1 and A2 were spot welded under the common welding conditions of the following Table 1 with constant electrode forces and changed weld currents to form nuggets of 3 mm, 4 mm, and 5 mm size, then were immediately cooled by liquid nitrogen. After that, the welded test pieces were cut into sizes of 10 mm×10 mm so as to include the nuggets. The amounts of hydrogen entering the spot weld zone in the welded test pieces A1 and A2 were measured by raising the temperatures of the test pieces to make them discharge the hydrogen and measuring the discharged amounts of hydrogen by a gas chromatography. The rates of temperature rise were 100° C./hour, the peak temperatures were 200° C., and the amounts of hydrogen discharged up to 200° C. were made the amounts of hydrogen entering the spot weld zone. Further, test pieces B were squeezed and applied with current in the same way as spot welding to form nuggets of similar sizes. The amounts of hydrogen of the test pieces B after applying current were measured in the same way. The results for the test pieces A1 and A2 are shown in FIG. 1. "a" shows the results for the test pieces A1, while "b" shows the results for the test pieces A2.

TABLE 1

| | Common welding conditions | | |
|---|---|---|---|
| Nugget diameter | Squeeze time | Weld time | Hold time |
| 3, 4, 5 mm | 30 cycles | 12 cycles | 5 cycles |

In the test pieces A1 on which oil was coated, as shown in "a" of FIG. 1, at the nuggets of all of the sizes of 3 to 5 mm, 0.25 µg or more amounts of hydrogen were detected, but in the test pieces A2 on which oil was not coated, as shown in "b" of FIG. 1, while some hydrogen was detected at the nugget size of 4 mm, hydrogen was not detected at the other sizes. Further, in the test pieces B, no hydrogen was detected at any of the nugget sizes.

If calculating the hydrogen concentration for a nugget size of 3 mm of the test pieces A1 assuming that hydrogen only penetrates the nugget, it was discovered that an extremely high concentration of 3.8 ppm results and there is a high possibility of this becoming a factor causing delayed fracture.

From the above results, it was found that if there is oil between the facing surfaces of the steel sheets in spot welding, the amount of hydrogen entering the spot weld zone at the steel sheets after welding remarkably increases. Further, from the results of the test pieces B, it was found that hydrogen does not penetrate the steel sheets from the electrode side surfaces.

By this test, it was confirmed that oil becomes a source of penetration of hydrogen, so next the inventors investigated the mechanism by which hydrogen derived from the oil penetrated the steel sheets at the time of spot welding.

In the results of "a" of FIG. 1, no relationship could be observed between the nugget size and amount of hydrogen entering the spot weld zone, so the inventors studied the relationship between the area of the contact part at time of initial squeezing in the case where there is oil present between the facing surfaces of the steel sheets and the amount of hydrogen entering the spot weld zone after welding.

First, they inserted pressure measurement film between two steel sheets and overlaid them, squeezed the overlaid steel sheets from the two sides by spot welding electrodes by electrode forces of 200 kgf and 400 kgf, and measured the areas of the sheet contact parts at that time. Next, they spot welded steel sheets coated with oil at the facing surface sides while squeezing them by the same electrode forces and measured the amounts of hydrogen of the steel sheets after welding by the thermal desorption spectroscopy. The results are shown in Table 2.

From Table 2, it was discovered that if the areas of the parts of the steel sheets contacted at the time of initial squeezing in spot welding (contact part) become larger, the amounts of hydrogen penetrating the insides of the steel sheets also increase.

TABLE 2

| | Electrode force | |
|---|---|---|
| | 200 kgf | 400 kgf |
| Area of contact part | 4.91 mm$^2$ | 7.55 mm$^2$ |
| Amount of penetration of hydrogen | 0.17 μg | 0.29 μg |

From this test, since if the area of the contact part becomes greater, the amount of oil trapped at the contact part increases and the amount of hydrogen penetrating inside the steel sheets are also believed to increase and since no correlation is seen between the nugget size and the amount of hydrogen entering the spot weld zone, it is believed that the amount of oil held between the steel sheets contacting each other at the start of squeezing determines the amount of hydrogen entering the spot weld zone.

Figure 2:
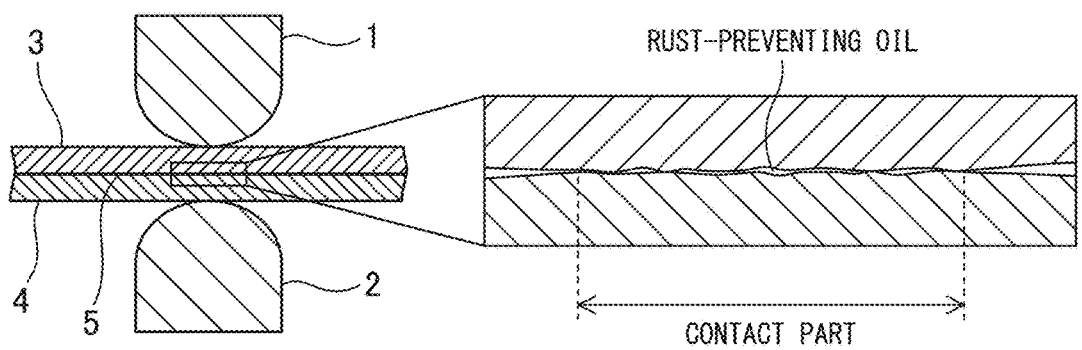
FIG. 2 is a schematic view for explaining oil being trapped in a contact part of steel sheets at the time of initial squeezing in spot welding.

That is, as shown in FIG. 2, if oil 6 is coated on the facing surfaces 5 of the steel sheets 3 and 4, at the time of initial squeezing of the steel sheets 3 and 4 by the electrodes 1 and 2, oil is trapped between the contacting steel sheets (contact part 7). That trapped oil is not discharged from the contact part to the outside even at the time of applying current for heating. It is believed that the amount of hydrogen entering the spot weld zone the steel sheets increases due to this.

Therefore, the inventors studied means for discharging oil from the inside to the outside of the steel sheet contact part at the time the steel sheets contact each other at the start of squeezing. As a result, they came up with the idea of forming in advance passages enabling discharge of oil to outside of the contact part so as to run through the contact part and connected to the outside of the contact part and conducted the following test.

As the steel sheets formed with passages, the inventors polished the entire surfaces of steel sheets of a size of 30×30 mm and thickness of 1 mm using abrasive papers with a #80 and #400 grain size so as to prepare steel sheets formed with large numbers of lines (fine line-shaped grooves) on the surfaces. For comparison, they also prepared unpolished steel sheets.

The inventors prepared pluralities of steel sheets comprised of unpolished steel sheets overlaid with oil interposed at the facing surfaces and steel sheets comprised of polished steel sheets overlaid with polished surfaces being overlaid and with oil interposed between the facing surfaces. They spot welded the center parts of the overlaid steel sheets under the conditions of Table 3.

The results of measurement of the amounts of penetration of hydrogen in the overlaid steel sheets and the rates of change from the reference value when using as the reference the amount of hydrogen of unpolished steel sheets are shown together in Table 4.

In the steel sheets with facing surfaces polished by #80 and #400 abrasive paper and steel sheets formed with unevenness of stripe pattern by dies, the amounts of hydrogen entering the spot weld zone were extremely low. It was surmised that the oil was discharged to outside the contact part along the lines.

From the above results, the validity of forming passages for discharging oil from the inside to the outside of a steel sheet contact part to prevent penetration of hydrogen to steel sheets due to oil was confirmed.

TABLE 3

| Polishing conditions | Spot welding conditions | | | | |
|---|---|---|---|---|---|
| | Electrode force | Squeeze time | Weld time | Weld current | Hold time |
| No polishing, #80 polishing, #400 polishing | 400 kgf | 30 cycles | 12 cycles | 5.3 kA | 5 cycles |

TABLE 4

| | Average amount of hydrogen (μg) | Rate of change (%) |
|---|---|---|
| No polishing | 0.282 | Reference |
| #80 polishing | 0.028 | 89.9 |
| #400 polishing | 0.001 | 99.7 |

As explained above, the validity of forming lines by abrasive paper was confirmed, so the inventors engaged in further study of the form of the lines and thereby reached the present invention. Below, the requirements and preferable requirements for working the present invention will be further explained.

Range of Formation of Lines

The range of formation of the lines is made the range at which the steel sheets contact at the facing surfaces of the steel sheets at the start of squeezing by the electrodes in the spot welding (referred to as "initial contact part". Note that sometimes abbreviated as "contact part") and a range beyond that. If the lines are not formed beyond the range at which the steel sheets contact each other, the oil cannot be discharged from the contact part to the outside. The range of the initial contact part can be evaluated by pressure measurement film.

The lines may be formed for each spot welding location of the steel sheet or may be formed to include a plurality of spot welding locations.

Form of Lines

The lines have to continue from at least the inside of the contact part to the outside of the contact part. The two end parts of the lines are preferably positioned outside of the contact part, that is, run from the outside of the contact part through the contact part to the outside of the contact part.

Figure 3:
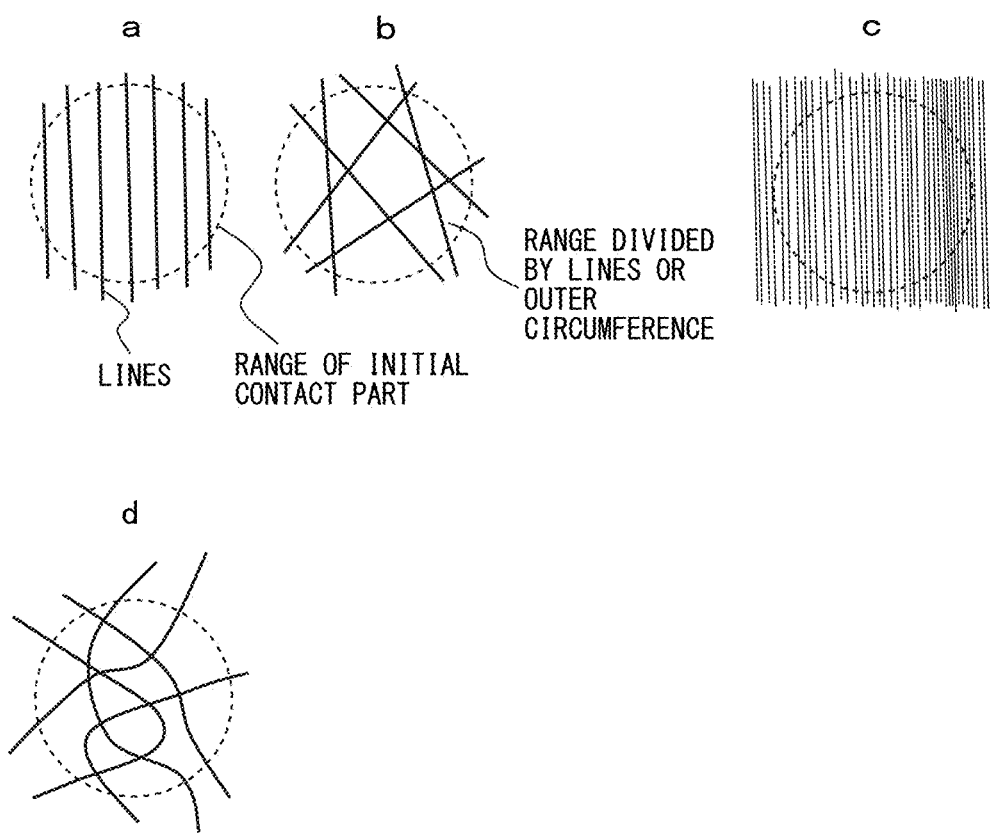
FIG. 3 is a view schematically showing examples of patterns of lines formed at a position scheduled for spot welding at facing surfaces of steel sheets.

Representative forms of the lines are shown in FIG. 3. "a" shows the case of forming non-intersecting lines, "b" shows the case of forming intersecting lines, "c" shows the case of densely forming lines by abrasive paper, and "d" shows the case of forming curved lines.

The number of lines is preferably four or more in total for the facing surfaces. If there are not four or more lines, the amount of oil removed from the overall range of the initial contact part tends to be small.

At the surface inside the range of the initial contact part, the area of the biggest range among the ranges divided by the lines and/or outer circumference of the contact surface (see "b" of FIG. 3) is preferably 30% or less of the area of the contact part. If over 30%, the oil removed tends to be small.

The width of the lines and the surface roughness Sa showing the roughness of the surface of the contact part lines differ when forming lines on one or on both of the facing surfaces of the steel sheets. They are made the following conditions (a), (b).

The surface roughness Sa relates to the depth of the lines (depth of grooves). If satisfying the conditions prescribed below in accordance with the number of lines, it is possible to sufficiently remove the oil, so this is preferable. Note that when the number of lines is large, a preferable effect is obtained by just satisfying Sa.

(a) Case where both facing surfaces of steel sheets are formed with four or more lines (a1) When numbers N of lines at both facing surfaces of steel sheets are respectively 4≤N<20
Width of lines: 0.2/N (mm) or more
Surface roughness Sa: −0.09×N+2 (μm) or more (a2) When numbers N of lines at both facing surfaces of steel sheets are respectively 20≤N
Width of lines: not designated
Surface roughness Sa: 0.2 μm or more (b) Case where at least one of steel sheets forming facing surfaces of steel sheets is formed with four or more lines (b1) When number N of lines is 4≤N<20
Width of lines: 0.4/N (mm) or more
Surface roughness Sa: −0.07×N+1.9 (μm) or more (b2) When number N of lines is 20≤N
Width of lines: not designated
Surface roughness Sa: 0.5 μm or more Note that if providing at least one of the steel sheets forming the facing surfaces of the steel sheets with four or more lines, the other steel sheet need not be provided with lines or may be provided with three or less lines.

Sa is a surface roughness parameter defined by ISO25178. The divided ranges, widths of the lines (grooves), and Sa can be measured by a laser microscope.

Sa is used as a metric for surface roughness, but in the present invention, it is necessary that lines acting as channels for oil be formed on the surface of the steel sheet. It is not enough that the surface be rough in state. Therefore, the widths and numbers of the lines are prescribed together as above.

Method of Formation of Lines

For the method of formation of the lines at the spot welding zone of the steel sheets, aside from the method used in the above experiment of polishing the surface by abrasive paper or abrasive cloth, the method of stamping by a die to insert lines, the method of scratching out lines by a scriber, and other suitable methods can be employed.

Method of Formation of Unevenness of Stripe Pattern Using Die

As another example of the method of formation of lines, the method of formation of an unevenness of stripe pattern using a die will be explained.

In the method of formation of a pattern of relief lines using a die, when working a steel sheet to obtain a steel sheet member, at the same time as the work, the location becoming the contact part at the time of initial squeezing in the spot welding is formed with an unevenness of stripe pattern. Specifically, this is characterized by providing the die with fine projections and giving an unevenness of stripe pattern to the material worked in the press forming operation, that is, the steel sheet or steel pipe, at the sliding position.

Figure 4:
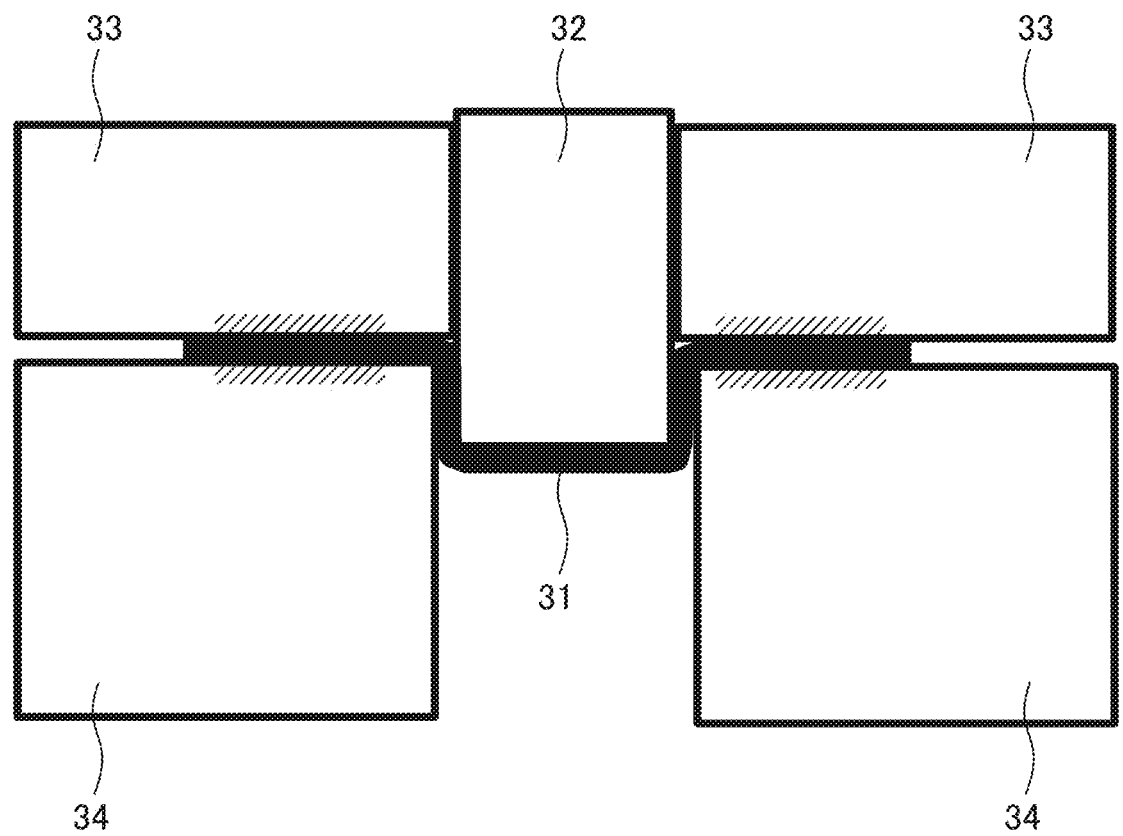
FIG. 4 is a view for explaining an example where a steel sheet held between a blank holder and die is made to slide in a drawing operation.

The arrangement of the projections or the shape of the pattern imparted is not particularly limited. The method of imparting stripe shapes to the die is not particularly limited, but for example it is possible to impart them by an end mill. For example, consider the drawing work such as shown in FIG. 4. A punch 32 can be used to apply pressure to a steel sheet 31 gripped by a blank holder 33 and die 34 to work the steel sheet 31 into a recessed shape.

At this time, the part of the steel sheet 31 held between the blank holder 33 and the die 34 receives contact pressure in the sheet thickness direction by the blank holder 33 and the die 34 and slides when the steel sheet 31 deforms. In the present invention, by providing fine projections to the surface of the blank holder 33 and/or die 34 at the location against which the steel sheet 31 slides (for example, the hatched part in FIG. 4), a pattern is formed at the surface of the sliding steel sheet 31.

The size and array of the projections provided at the die may be suitably determined in accordance with the pattern to be formed. For example, the surface sliding against the steel sheet or steel pipe may be formed with a pattern of projections of a height of 10 to 100 μm and intervals of 50 to 1000 μm.

According to this method, when the steel sheet 31 is drawn by press working, it is possible to impart a regular pattern to the surface of the steel sheet 31 simultaneously being slid against, so no special process is required for imparting the pattern. Further, by making the position where the projections are provided at the die a specific position, it is also possible to impart part of the pattern to the steel sheet 31.

Further, when imparting an unevenness of stripe pattern to the part held between the blank holder 33 and die 34, it is possible to use a distance block (not shown) to control the surface of the blank holder to a fixed distance, so it is possible to impart an unevenness of stripe pattern of any groove depth. Further, by control of the cushion pressure, it is possible to control the contact pressure to any value.

Figure 5:
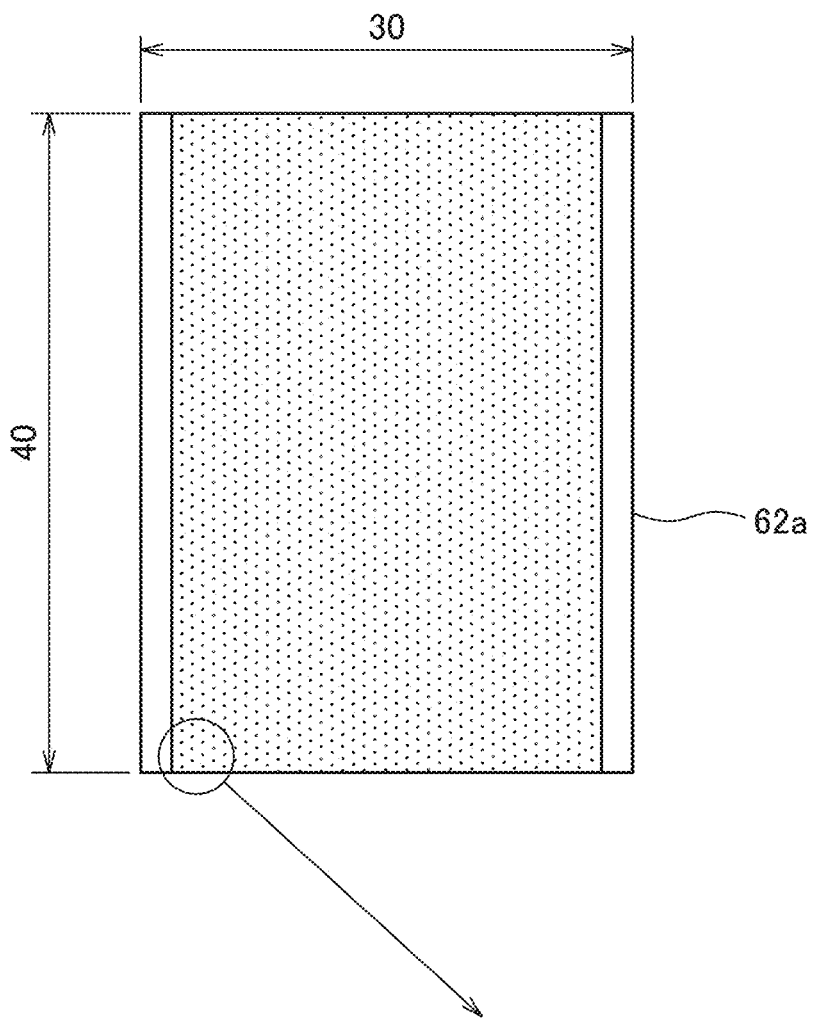
FIG. 5 is a view showing an example of a regular pattern formed on a surface of a die.
Figure 5:
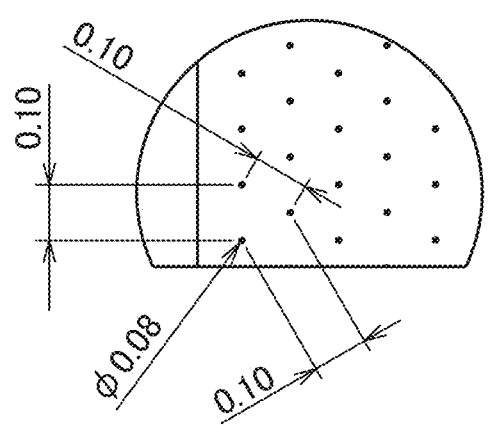
Figure 6:
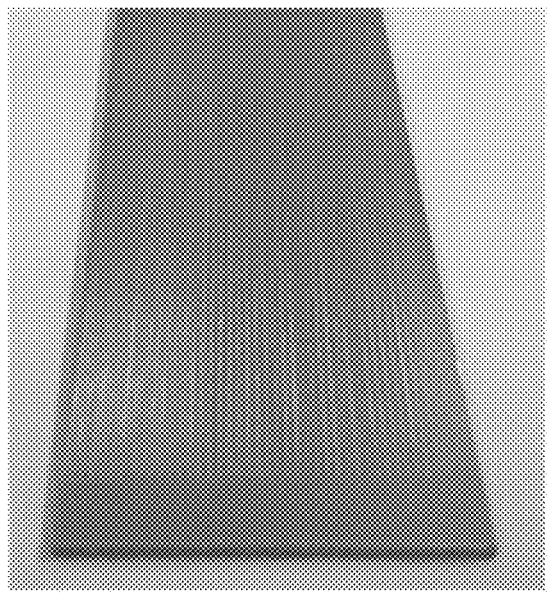
FIG. 6 is a view showing states of the surfaces of steel sheets drawn under control of cushion pressure using a die formed with a regular pattern.
Figure 6:
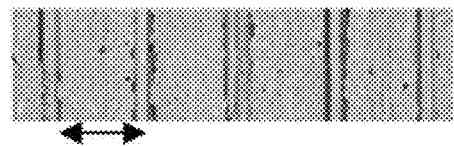
Figure 6:
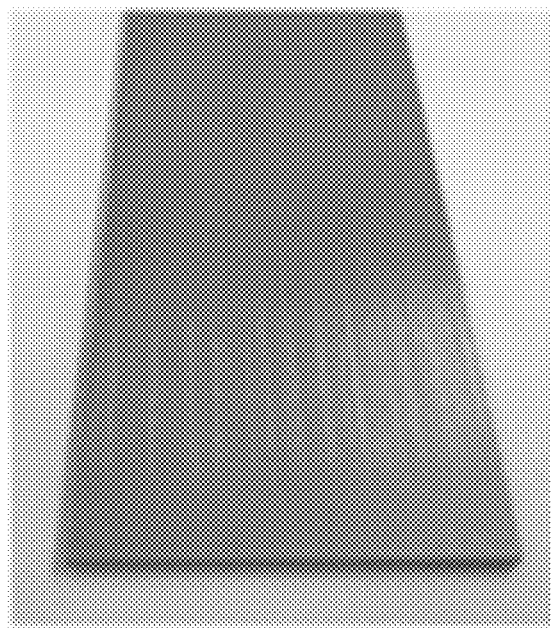
Figure 6:

The surface of the die 34 was formed with the regular pattern shown in FIG. 5 and the steel sheet was drawn by a pressing load of 2.9 MPa and 4.8 MPa under control of the cushion pressure. FIG. 6 shows the states of the surfaces after drawing.

Further, Table 5 shows the Sa (arithmetic average height: μm) and Str at the time of no polishing, #80 polishing and #400 polishing and drawing by pressing loads of 2.9 MPa and 4.8 MPa. In Table 5, the average amounts of hydrogen of the weld metal part when spot welding with the respective surface conditions facing each other are shown. The reference results of no polishing are the same as in Table 4. From the results, it will be understood that if the Str is 0.3 or less, there is the effect that the average amount of hydrogen can be remarkably decreased (80% or more) and the possibility of hydrogen embrittlement cracking can be greatly reduced. Further, it will be understood that even with polishing, if the Str is small, the amount of hydrogen entering the spot weld zone can be greatly decreased.

TABLE 5

|  | Average amount of hydrogen (μg) | Rate of change (%) | Sa(μm) arithmetic average height | Str |
|---|---|---|---|---|
| No polishing | 0.282 | Reference | 0.88 | 0.85 |
| #80 polishing | 0.028 | 89.9 | 0.73 | 0.03 |
| #400 polishing | 0.001 | 99.7 | 0.26 | 0.01 |
| Drawing by pressing load of 2.9 MPa | 0.058 | 79.5 | 5.11 | 0.17 |
| Drawing by pressing load of 4.8 MPa | 0.050 | 82.3 | 7.01 | 0.06 |

Form of Pattern of Lines

The pattern of lines has to at least run from the inside of the contact part to the outside of the contact part. Preferably, the two end parts of the lines are positioned outside of the contact part, that is, the lines run from the outside of the contact part through the contact part to the outside of the contact part.

The unevenness of stripe pattern is preferably a regular pattern giving an aspect ratio (Str) of the surface conditions of 0.3 or less in order to sufficiently remove rust-preventing oil. Str is a parameter defined by ISO25178-2 expressing the isotropy and anisotropy of the surface conditions. If close to 0, it indicates there are lines etc., while if close to 1, it indicates the surface is not directionally dependent. Providing four or more stripes is preferable in removing rust-preventing oil from the entire range of the initial contact part.

In the present invention, a first steel sheet member comprised of a steel sheet worked using a die and a steel sheet or a second steel sheet member comprised of a worked steel sheet are overlaid and spot welded. If the first steel sheet member is formed with an unevenness of stripe pattern, the steel sheet or second steel sheet member to be spot welded with may be formed with a pattern or may not. Further, the number of the overlaid steel sheets is not limited to two. It may be three or more as well. Further, the types, compositions of constituents, and thicknesses of the overlaid steel sheets may all be the same or may be different from each other.

Further, the invention is not limited to a joint comprised of separate steel sheets. The "steel sheet" to be spot welded with the first steel sheet member may also be part of the first steel sheet member.

Other Forms

Figure 7:
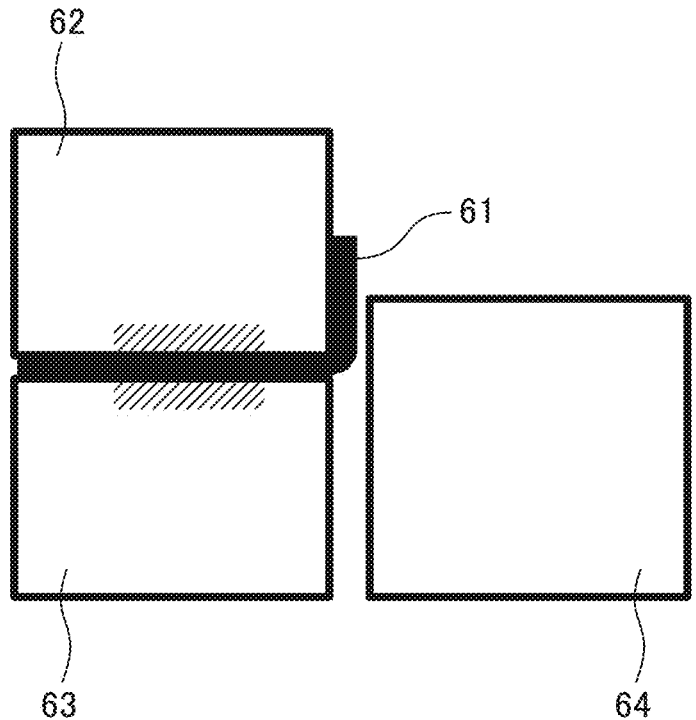
FIG. 7 is a view for explaining an example where a steel sheet held between a punch and pad is made to slide in a bending operation.

For the bending operation of FIG. 7, if the steel sheet 61 is held between the punch 62 and the pad 63, the punch 62 and/or pad 63 may be provided with projecting parts and made to slide so as to impart an unevenness of stripe pattern. The pad can also be controlled to a fixed distance by using a distance block (not shown) in the same way as the case of the blank holder.

Figure 8:
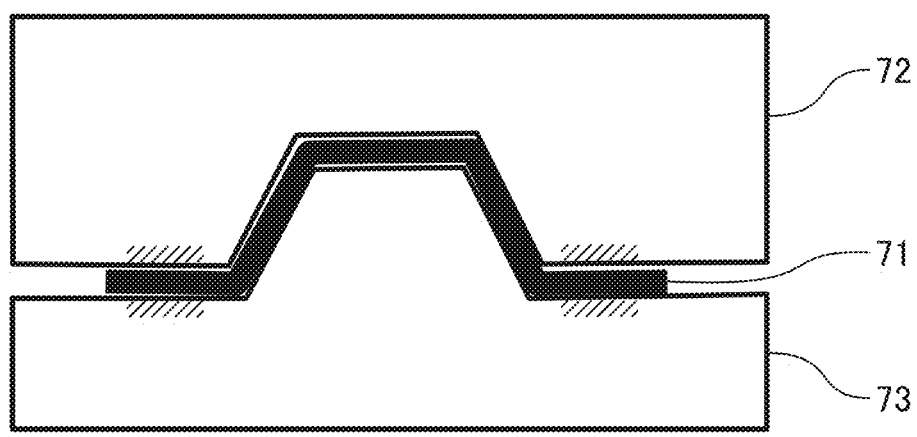
FIG. 8 is a view for explaining an example where a steel sheet held between an upper die and lower die is made to slide in a stamping or restrike operation.

For the stamping or restrike operation shown in FIG. 8, if the steel sheet 71 is held between the upper die 72 and the lower die 73, the upper die 72 and/or the lower die 73 may be provided with projecting parts so as to form an unevenness of stripe pattern at the location of the steel sheet 71 at the sliding location of the steel sheet gripped by the upper die 72 and lower die 73. In this case as well, it is possible to use a distance block (not shown) to impart any depth of stripe grooves.

The present invention can also be applied to the case where the steel sheet member is a steel pipe. For example, in the case of rotary pull bending of steel pipe, by giving projections to the pressure die, it is possible to give an unevenness of stripe pattern to the surface of the steel pipe sliding with the pressure die.

Figure 9:
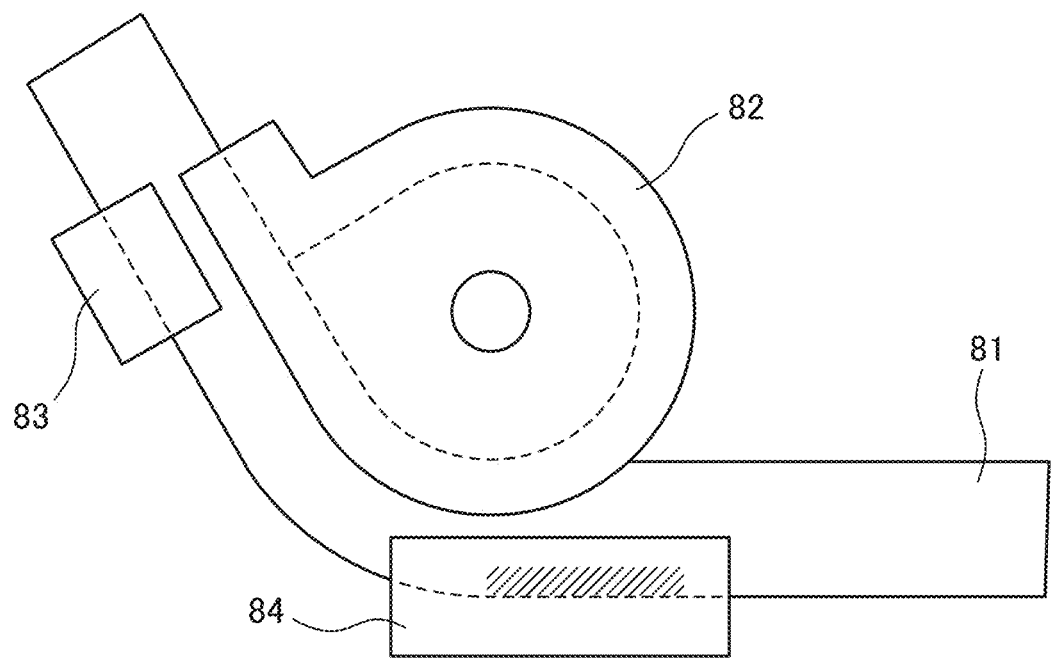
FIG. 9 is a view for explaining an example where a steel pipe bent by a rotary pull bending operation is made to slide with respect to a pressure die.

As shown in FIG. 9, in the rotary pull bending of steel pipe, the steel pipe is held between a bending die 82 and a clamping die 83 provided at the outer circumferential surface of the steel pipe 81. The pressure die 84 is used to press the steel pipe in the bending die direction while the bending die and clamping die are rotated. The steel pipe is stretched while being made to bend. At this time, the steel pipe 81 slides with respect to the pressure die 84, so by giving projections to the surface of the pressure die 84 contacting the steel pipe 81, it is possible to give an unevenness of stripe pattern to the surface of the steel pipe.

The die position can be controlled to a fixed distance, so it is possible to give an unevenness of stripe pattern of any groove depth. Further, the pressure by a usual pressure die is 1 to 10 MPa or so, therefore is suitable for the present invention.

Figure 10:
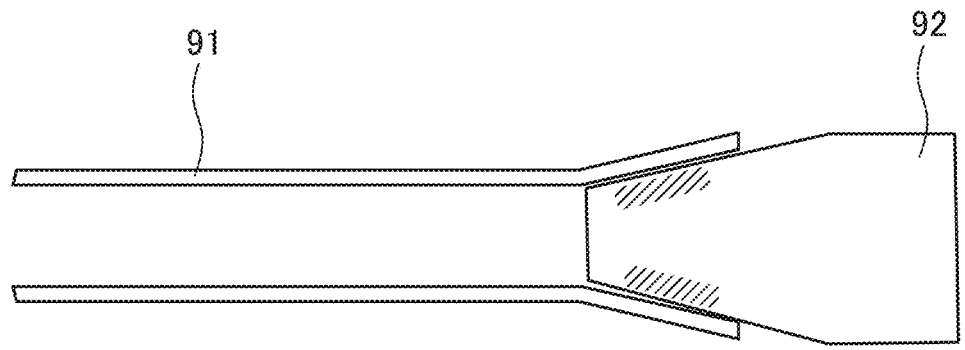
FIG. 10 is a view for explaining an example where a steel pipe is made to slide with respect to a punch by a tube expanding.

In the case of tube expanding shown in FIG. 10 as well, the present invention can be applied. In this case, by providing the punch 92 with projecting parts, it is possible to give an unevenness of stripe pattern to the sliding position of the steel pipe 91.

Others

The steel sheets used in the present invention include cut sheets cut to sizes suitable for press forming (for example, 1 m×1 m) and tailored blanks comprised of pluralities of different types of steel sheets butt welded together. The steel sheets used in the present invention need only be sheet like at the parts to be overlaid. They do not have to be sheets as a whole. For example, flange parts of members pressed formed into specific shapes of cross-sectional hat shapes etc. are also included. The number of the overlaid steel sheets is not limited to two. It may be three or more as well. Further, the types, compositions of constituents, and thicknesses of the overlaid steel sheets may all be the same or may be different from each other. The overlaid steel sheets may also be comprised of a plurality of steel sheets butt welded together. Further, the invention is not limited to a joint formed from separate steel sheets. A single steel sheet may be shaped into a tube or other predetermined shape and the end parts overlaid.

The strength of the steel sheet is not particularly limited. However, the problem of delayed fracture easily occurs in the case of spot welding high strength steel sheet, so the present invention is particularly effective for steel sheet with a tensile strength of 500 MPa or more and further steel sheet with a tensile strength of 780 MPa or more.

Further, the timing of formation of the lines is not particularly limited. As one example, it is possible to form the lines right before spot welding the steel sheets.

In the case of spot welding auto parts, it may be considered to press-form steel sheets to obtain "blanks", then shape and spot weld the blanks. In such a case, in both the state of steel sheets and the state of blanks, the positions to be finally spot welded are determined. Therefore, the lines may be formed at the locations scheduled for spot welding at the stage of the steel sheets (including cut sheets and tailored blanks) or the stage of shaping the blanks.

Examples

The inventors ran tests spot welding two overlaid test pieces comprised of strength 980 MPa class steel sheets of sizes of 30×30 mm and thicknesses of 1 mm. At that time, on one surface (single surface) or two surfaces (both surfaces) of sides of overlaid test pieces forming the facing surfaces, they used either dies (stamping), scribers, or abrasive paper to form a plurality of lines for enabling oil to escape and in constant widths near the parts scheduled for welding. For the oil, rust-preventing oil (made by Nihon Parkerizing Co., Ltd., NOX-RUST530F(60)) was used.

The conditions were set so that the initial contact part at the time of spot welding become a circular shape of a diameter of 3 mm. The lines were formed to pass through the contact part and extend by 1 mm or more to the outside from the outer circumference of the initial contact part. However, in some of the test pieces, for comparison, the lines were formed so as not to depart from the outer circumference of the initial contact part.

Figure 11:
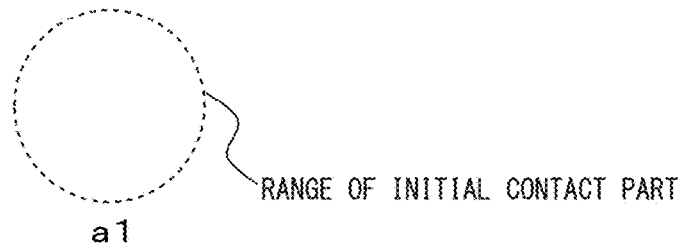
FIG. 11 is a view schematically showing patterns of lines formed at positions scheduled for spot welding at facing surfaces of steel sheets in the examples.
Figure 11:
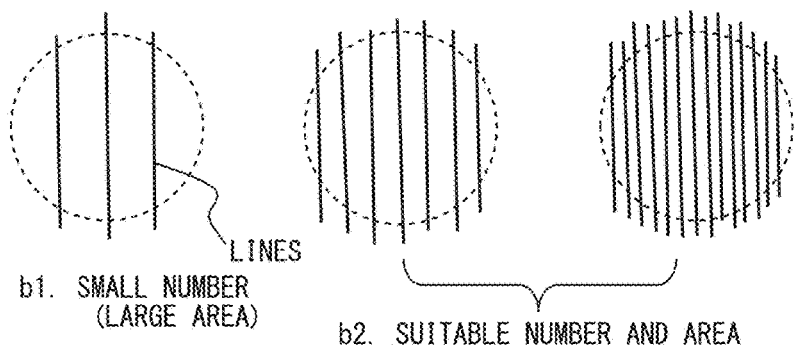
Figure 11:
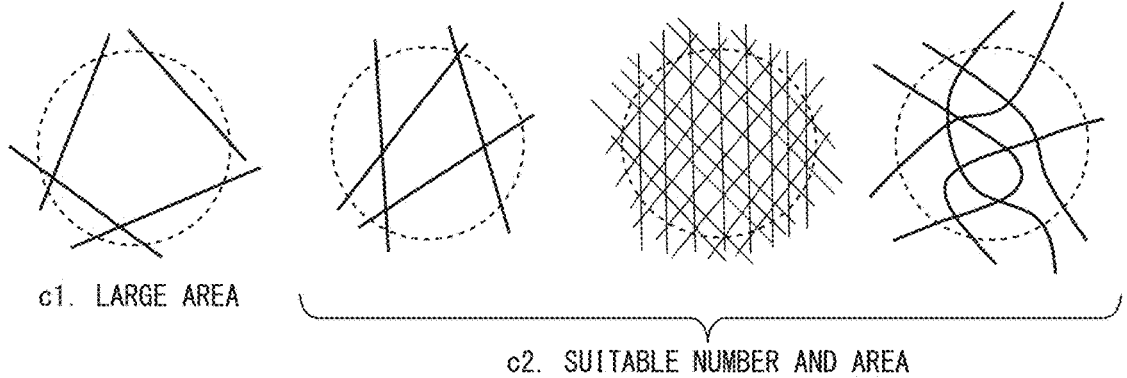
Figure 11:
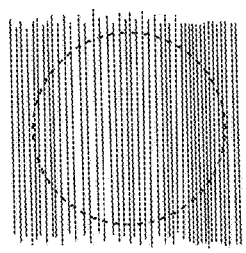
Figure 11:
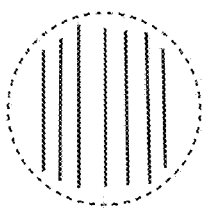

The patterns of the lines formed are shown in FIG. 11.

The patterns of lines include a pattern with no processing indicated by a1, patterns of lines formed by dies (stamping) or scribers and not intersecting (b1, b2), patterns of similar lines intersecting (c1, c2), and a pattern of a large number of lines formed by abrasive paper (d1). Further, a pattern with lines formed so as not to leave the outer circumference of the initial contact part was made the pattern (e1). Here, b1 and c1 are examples of small numbers of lines (large areas of ranges divided by lines or outer circumference), while b2 and c2 are examples of suitable numbers of lines (suitable areas of ranges divided by lines or outer circumference).

The test pieces formed with the lines were counted for numbers of lines and measured for surface roughness Sa. Further, when the number of lines N was less than 20, the area of the maximum range in the ranges divided by the lines or outer circumference of the contact surface was measured.

After the test piece was spot welded, it was immediately cooled by liquid nitrogen. After that, the welded test piece was cut into a 10 mm×10 mm size so as to include the nugget. The amount of hydrogen entering the spot weld zone was measured by raising the temperature of the test piece to make it discharge the hydrogen and measuring the discharged amount of hydrogen by a gas chromatography. The rate of temperature rise was 100° C./hour, the peak temperature was 200° C., and the amount of hydrogen discharged up to 200° C. was made the amount of hydrogen entering the spot weld zone.

The results are shown in Table 5.

Note that, Table 6 uses as the value of Sa required for decreasing hydrogen (lower limit value) the values (μm) calculated from formula (−0.09×N+2) in the case of both surfaces and from formula (−0.07×N+1.9) in the case of single surfaces when N<20 and 0.2 μm in the case of single surfaces and 0.5 μm in the case of both surfaces when N≥20.

As the widths of the lines required for decreasing hydrogen, the values calculated from formula 0.2/N (mm) in the case of both surfaces and from formula 0.4/N (mm) in the case of single surfaces when N<20 were used. When N≥20, the widths were not designated.

Regarding the maximum value of the divided area ratio, in the case of the pattern (e1), there were no parts divided by the lines and outer circumference of the contact surface, so the value was described as substantially 100.

In the invention examples, the amounts of hydrogen entering the spot weld zone greatly decreased compared with the reference value.

As opposed to this, in the comparative examples, the amounts of hydrogen entering the spot weld zone did not decrease much at all compared with the reference value.

TABLE 6

| Treated surfaces | No. of lines N | Sa required for decreasing hydrogen (μm) | Sa (μm) | Width of lines required for decreasing hydrogen (μm) | Width of lines (μm) | Maximum divided area ratio (%) | Amount of penetration of hydrogen (μg) |
|---|---|---|---|---|---|---|---|
| — | — | — | 0.85 | — | — | — | 0.282 |
| Both surfaces | 4 | 1.64 | 1.70 | 50.0 | 70 | 26 | 0.051 |
| | 5 | 1.55 | 1.90 | 40.0 | 100 | 20 | 0.059 |
| | 10 | 1.1 | 6.00 | 20.0 | 100 | 8 | 0.051 |
| | 15 | 0.65 | 1.50 | 13.3 | 170 | 2 | 0.044 |
| | 20 | 0.2 | 1.02 | Not designated | 170 | — | 0.039 |
| | Approx. 100 | 0.2 | 0.73 | Not designated | 30 | — | 0.028 |
| | Approx. 150 | 0.2 | 0.26 | Not designated | 20 | — | 0.001 |
| | 3 | 1.73 | 1.80 | 66.7 | 70 | 29 | 0.153 |
| | 4 | 1.64 | 1.69 | 50.0 | 40 | 24 | 0.144 |
| | 4 | 1.64 | 1.70 | 50.0 | 70 | 33 | 0.149 |
| | 5 | 1.55 | 2.71 | 40.0 | 100 | 100 | 0.294 |
| Single surface | 4 | 1.62 | 2.10 | 100.0 | 100 | 27 | 0.076 |
| | 5 | 1.55 | 1.90 | 80.0 | 100 | 18 | 0.071 |
| | 10 | 1.20 | 6.00 | 40.0 | 100 | 6 | 0.083 |
| | 15 | 0.85 | 1.52 | 26.7 | 170 | 2 | 0.091 |
| | 20 | 0.5 | 1.01 | Not designated | 170 | — | 0.034 |
| | Approx. 100 | 0.5 | 0.64 | Not designated | 30 | — | 0.095 |
| | 3 | 1.69 | 1.80 | 133.3 | 140 | 26 | 0.182 |
| | Approx. 150 | 0.5 | 0.26 | Not designated | 20 | — | 0.161 |
| | 4 | 1.62 | 1.67 | 100.0 | 170 | 35 | 0.149 |
| | 5 | 1.55 | 2.71 | 80.0 | 100 | 100 | 0.278 |

| Treated surfaces | Rate of decrease (%) | Method of forming lines | Pattern of lines | Remarks |
|---|---|---|---|---|
| — | — | No processing | a1 | Comp. ex. (reference) |
| Both surfaces | 81.8 | Lines formed by scriber | c2 | Inv. ex. |
| | 79.0 | Lines formed by stamping by die | b2 | Inv. ex. |
| | 81.9 | Lines formed by stamping by die | b2 | Inv. ex. |
| | 84.4 | Lines formed by scriber | c2 | Inv. ex. |
| | 86.2 | Lines formed by scriber | c2 | Inv. ex. |
| | 90.1 | Lines formed by #80 abrasive paper | d1 | Inv. ex. |
| | 99.6 | Lines formed by #400 abrasive paper | d1 | Inv. ex. |
| | 45.7 | Lines formed by scriber | b1 | Inv. ex. |
| | 48.9 | Lines formed by scriber | c2 | Inv. ex. |
| | 47.1 | Lines formed by scriber | c1 | Inv. ex. |
| | −4.3 | Lines formed by scriber | e1 | Comp. ex. |
| Single surface | 73.0 | Lines formed by scriber | c2 | Inv. ex. |
| | 74.8 | Lines formed by stamping by die | b2 | Inv. ex. |
| | 70.6 | Lines formed by stamping by die | b2 | Inv. ex. |
| | 67.7 | Lines formed by scriber | c2 | Inv. ex. |
| | 87.9 | Lines formed by scriber | c2 | Inv. ex. |
| | 66.3 | Lines formed by #80 abrasive paper | d1 | Inv. ex. |

TABLE 6-continued

| | | | |
|---|---|---|---|
| 35.5 | Lines formed by scriber | b1 | Inv. ex. |
| 42.9 | Lines formed by #400 abrasive paper | d1 | Inv. ex. |
| 47.0 | Lines formed by scriber | c1 | Inv. ex. |
| 1.4 | Lines formed by scriber | e1 | Comp. ex. |

REFERENCE SIGNS LIST 1, 2 spot welding electrodes
3, 4 steel sheets
5 facing surfaces of steel sheets
6 oil
7 contact part
11 range of initial contact part
12 lines
13 range divided by lines or outer circumference
21 range of initial contact part
22 lines
31 steel sheet
32 punch
33 blank holder
34 die
61 steel sheet
62 punch
63 pad
64 die
71 steel sheet
72 upper die
73 lower die
81 steel pipe
82 bending die
83 clamping die
84 pressure die
91 steel pipe
92 punch

The invention claimed is:

1. A method of producing a spot welded joint of overlaid steel sheets, at least one of the steel sheets having tensile strength of 500 MPa or more, facing surfaces of the steel sheets being coated with oil, the method comprising:
at one or both of the surfaces of the steel sheets becoming the facing surfaces of said steel sheets, working in advance a location where the steel sheets contact each other to form a contact part at the time of initial squeezing of spot welding to form lines of a plurality of line-shaped grooves running through the contact part and connected to the outside of the contact part; and
performing the spot welding at the location of the contact part while discharging the oil to the outside of the contact part through the lines,
wherein the lines are formed by abrasive paper, abrasive cloth, a die, or a scriber,
the number of the lines is respectively four or more at both of the surfaces of the steel sheets becoming the facing surfaces of the steel sheets and,
regarding the widths of the lines and the surface roughness Sa of the steel sheet surfaces of the contact part, the surfaces of the steel sheets becoming the facing surfaces are worked to form pluralities of lines so that, when the number of lines N is $4 \leq N < 20$, the width of the lines is $0.2/N$ (mm) or more and the surface roughness Sa is $-0.09 \times N + 2$ (μm) or more and when the number of lines N is $20 \leq N$, the surface roughness Sa is 0.2 μm or more.

2. The method of producing a spot welded joint according to claim 1, wherein an area of the contact part is divided by the lines into a plurality of ranges and a size of an area of a biggest range among the plurality of ranges divided by the lines or the outer circumference of the contact part is 30% or less of the area of the contact part.

3. A welded product of overlaid steel sheets spot welded according to the method of claim 1.

4. The welded product according to claim 3, wherein an area of the contact part is divided by the lines into a plurality of ranges and a size of an area of a biggest range among the plurality of ranges divided by the lines or the outer circumference of the contact part is 30% or less of the area of the contact part.

5. The welded product according to claim 3, wherein when the number of lines N is $4 \leq N < 20$, the width of the lines is $0.4/N$ (mm) or more and the surface roughness Sa is $-0.07 \times N - 1.9$ (μm) or more and when the number of lines N is $20 \leq N$, the surface roughness Sa is 0.5 μm or more.

6. The welded product according to claim 3, wherein at least one of the lines intersects another of the lines, or at least one of the lines is curved.

7. The welded product according to claim 5, wherein an area of the contact part is divided by the lines into a plurality of ranges and a size of an area of a biggest range among the plurality of ranges divided by the lines or the outer circumference of the contact part is 30% or less of the area of the contact part.

8. The method of producing a spot welded joint according to claim 1, wherein an aspect ratio (Str) of the contact part formed with the lines of the plurality of line-shaped grooves is 0.3 or less.

9. A welded product of overlaid steel sheets spot welded according to the method of claim 1,
the steel sheet having an aspect ratio (Str) of the contact part formed with the lines of the plurality of line-shaped grooves being 0.3 or less.

10. The method of producing a spot welded joint according to claim 1, wherein the lines of the plurality of line-shaped grooves are formed by using a die having projecting parts contact at least one of the steel sheet's facing surfaces and make the at least one steel sheet slide with respect to the die to thereby form in advance an unevenness of stripe pattern running through the contact part and connected to the outside of the contact part.

11. The method of producing a spot welded joint according to claim 10, wherein an aspect ratio (Str) of the contact part formed with the unevenness of stripe pattern is 0.3 or less.

12. A welded product of overlaid steel sheets spot welded according to the method of claim 10.

13. The welded product according to claim 12, wherein an aspect ratio (Str) of the contact part formed with the unevenness of stripe pattern is 0.3 or less.

14. The welded product according to claim 12, wherein at least one of the lines intersects another of the lines, or at least one of the lines is curved.

15. The welded product according to claim 13, wherein at least one of the lines intersects another of the lines, or at least one of the lines is curved.

16. The method of producing a spot welded joint according to claim 1, wherein at least one of the lines intersects another of the lines, or at least one of the lines is curved.

17. A method of producing a spot welded joint of overlaid steel sheets, at least one of the steel sheets having tensile strength of 500 MPa or more, facing surfaces of the steel sheets being coated with oil, the method comprising:

at one or both of the surfaces of the steel sheets becoming the facing surfaces of said steel sheets, working in advance a location where the steel sheets contact each other to form a contact part at the time of initial squeezing of spot welding to form lines of a plurality of line-shaped grooves running through the contact part and connected to the outside of the contact part; and performing the spot welding at the location of the contact part while discharging the oil to the outside of the contact part through the lines, wherein the lines are formed by abrasive paper, abrasive cloth, a die, or a scriber, the number of the lines is respectively four or more at least at one of the surfaces of the steel sheets becoming the facing surfaces of the steel sheets and, regarding the widths of the lines and the surface roughness Sa of the steel sheet surfaces of the contact part, the surface of the at least one steel sheet becoming the facing surface is worked to form the lines so that, when the number of lines N is $4 \leq N < 20$, the width of the lines is $0.4/N$ (mm) or more and the surface roughness Sa is $-0.07 \times N + 1.9$ (μm) or more and when the number of lines N is $20 \leq N$, the surface roughness Sa is 0.5 μm or more.

18. The method of producing a spot welded joint according to claim 17, wherein an area of the contact part is divided by the lines into a plurality of ranges and a size of an area of a biggest range among the plurality of ranges divided by the lines or the outer circumference of the contact part is 30% or less of the area of the contact part.

* * * * *